(12) United States Patent
Motahari Nezhad et al.

(10) Patent No.: US 10,990,991 B2
(45) Date of Patent: Apr. 27, 2021

(54) SYSTEM FOR COGNITIVE DEAL PRICING

(71) Applicant: INTERNATIONAL BUSINESS MACHINES CORPORATION, Armonk, NY (US)

(72) Inventors: Hamid Reza Motahari Nezhad, San Jose, CA (US); Peifeng Yin, San Jose, CA (US); Aly Megahed, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 16/130,579

(22) Filed: Sep. 13, 2018

(65) Prior Publication Data

US 2020/0090198 A1 Mar. 19, 2020

(51) Int. Cl.
*G06Q 30/02* (2012.01)
*G06K 9/62* (2006.01)
*G06N 20/00* (2019.01)

(52) U.S. Cl.
CPC ....... *G06Q 30/0206* (2013.01); *G06K 9/6256* (2013.01); *G06N 20/00* (2019.01); *G06Q 30/0201* (2013.01)

(58) Field of Classification Search
CPC .......... G06Q 30/0206; G06Q 30/0201; G06Q 30/0283; G06Q 30/0611; G06N 20/00; G06N 3/08; G06N 20/20; G06K 9/6256; G06K 9/6227; G06F 30/27; G06F 16/3347; G05B 2219/21002
See application file for complete search history.

(56) References Cited

U.S. PATENT DOCUMENTS

| | | | |
|---|---|---|---|
| 7,376,593 B2 | 5/2008 | Schulze | |
| 9,659,110 B2 | 5/2017 | Arnold et al. | |
| 10,311,529 B1* | 6/2019 | Noel | G06N 20/00 |
| 2006/0089943 A1 | 4/2006 | Creel et al. | |
| 2009/0076928 A1 | 3/2009 | Hjertonsson et al. | |
| 2009/0313065 A1 | 12/2009 | George et al. | |

(Continued)

FOREIGN PATENT DOCUMENTS

WO 2012037477 A3 3/2012

OTHER PUBLICATIONS

Megahed et al.; "Top-Down Pricing of IT Services Deals with Recommendation for Missing Values of Historical and Market Data"; In Proceedings of the International Conference on Service-Oriented Computing (ICSOC), pp. 745-760, 2016.

(Continued)

*Primary Examiner* — Mehmet Yesildag
*Assistant Examiner* — Ayanna Minor
(74) *Attorney, Agent, or Firm* — Winstead PC (57) ABSTRACT

A system for cognitive deal pricing may include a memory having stored thereon historical deal information that includes historical deal components and historical deal communication associated therewith for historical deals. The system may also include a processor cooperating with the memory and configured to use machine learning to analyze the historical deal information to determine a predicted client type for each current deal component of a current deal, and generate the deal pricing based upon the predicted client type for each current deal component of the current deal.

10 Claims, 8 Drawing Sheets

(56) References Cited

U.S. PATENT DOCUMENTS

| | | | |
|---|---|---|---|
| 2012/0323558 A1* | 12/2012 | Nolan | G06F 40/211 |
| | | | 704/9 |
| 2013/0290128 A1 | 10/2013 | Balamurugan et al. | |
| 2015/0220999 A1* | 8/2015 | Thornton | H04M 15/8011 |
| | | | 705/14.66 |
| 2015/0269641 A1 | 9/2015 | Roy | |
| 2016/0155069 A1* | 6/2016 | Hoover | G06N 20/20 |
| | | | 706/12 |
| 2017/0017960 A1 | 1/2017 | Subramaniam | |
| 2017/0185918 A1 | 6/2017 | Chawla et al. | |
| 2017/0372341 A1 | 12/2017 | Fukuda et al. | |
| 2019/0361926 A1* | 11/2019 | Rogynskyy | H04M 15/755 |

OTHER PUBLICATIONS

Greenia et al.; "A win prediction model for IT outsourcing bids. In: Service Research and Innovation Institute Global Conference", pp. 39-42 (2014).

Nezhad, Hamid R. Motahari, et al. "Health identification and outcome prediction for outsourcing services based on textual comments," in IEEE SCC, 2014, pp. 155-162.

Megahed et al.; "Modeling business insights into predictive analytics for the outcome of IT service contracts," Proc. IEEE International Conference on Service Computing, 2015, pp. 515-521.

\* cited by examiner

SYSTEM FOR COGNITIVE DEAL PRICING

BACKGROUND

The present invention relates to cognitive computing, and more specifically, to a cognitively determining deal pricing and related methods. Information technology (IT) service providers, for example, may compete to win relatively highly valued IT contracts, to deliver IT services to clients. In a typical process, a client submits a request for proposal (RFP). Providers then prepare a solution, price that solution, and then typically negotiate with the client trying to convince them to accept their solution over the competitors.

Pricing IT service deals may be considered a relatively complex problem considering the client's objectives for each service within a contract is different. There may be different objectives that the client wants to achieve for different solution components of the deal. For some solution components, a client may be looking for innovation partners, to cut costs, etc.

SUMMARY

A system for cognitive deal pricing may include a memory having stored thereon historical deal information that includes historical deal components and historical deal communication associated therewith for each of a plurality of historical deals. The system may include a processor cooperating with the memory and configured to use machine learning to analyze the historical deal information to determine a predicted client type for each current deal component of a current deal, and generate the deal pricing based upon the predicted client type for each current deal component of the current deal.

The processor may be configured to use machine learning to analyze the historical deal information to determine the predicted client type for each current deal component based upon a trained model, for example. The trained model may include a vector build up trained model.

The processor may be configured to generate the vector build up trained model based upon a feature vector for structured data of the historical deal information. The processor may be configured to generate the vector build up trained model based upon at least one of a bag-of-words feature vector, a topic modeling vector, and a word-embedding technique, for example.

The vector build up trained model may include a model that concatenates a plurality of feature vectors into a single vector; and wherein the processor is configured to train a machine learning classifier based upon the single vector.

The trained model may include a hybrid model based upon a combination model trained on a feature vector of structured data of the historical deal information and a further classifier trained on a feature vector of unstructured data of the historical deal information. The hybrid model may be based upon at least one of an aggregation function, a user-input function, and an ensemble function, for example. The processor may be configured to generate the deal pricing using a pricing algorithm based upon an average price for similar deals from the historical deal information, for example.

The historical deal information may include historical requests for proposal (RFPs), for example. The processor may be configured to use machine learning to determine the predicted client type based upon a client metadata.

The processor may be configured to generate the deal pricing based upon a pricing algorithm having the predicted client type as an input. The processor may be configured to determine the deal pricing by at least one of determining a client type deal price for each client type and determining a component pricing for each deal component, for example.

A method aspect is directed to a method for cognitive deal pricing and may include using a processor cooperating with a memory having stored thereon historical deal information comprising historical deal components and historical deal communication associated therewith for each of a plurality of historical deals. The processor may be used to use machine learning to analyze the historical deal information to determine a predicted client type for each current deal component of a current deal, and generate the deal pricing based upon the predicted client type for each current deal component of the current deal.

A computer readable medium aspect is directed to a computer readable medium for a system for cognitive deal pricing. The computer readable medium includes computer executable instructions that when executed by a processor cooperating with a memory having stored thereon historical deal information comprising historical deal components and historical deal communication associated therewith for each of a plurality of historical deals, cause the processor to perform operations. The operations may include using machine learning to analyze the historical deal information to determine a predicted client type for each current deal component of a current deal, and generating the deal pricing based upon the predicted client type for each current deal component of the current deal.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
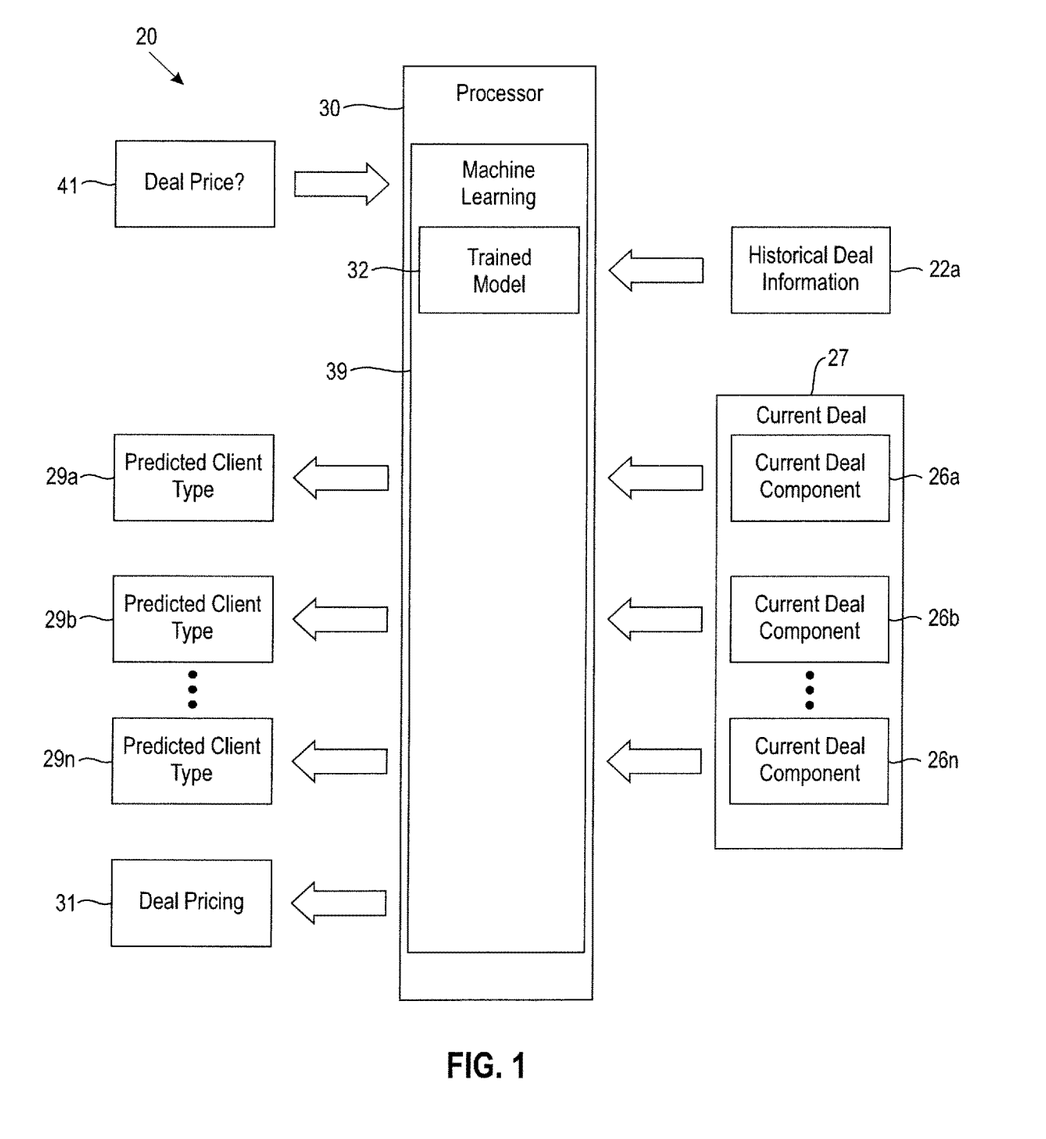
FIG. 1 is a schematic diagram of a system for cognitive deal pricing in accordance with an embodiment.
Figure 2:
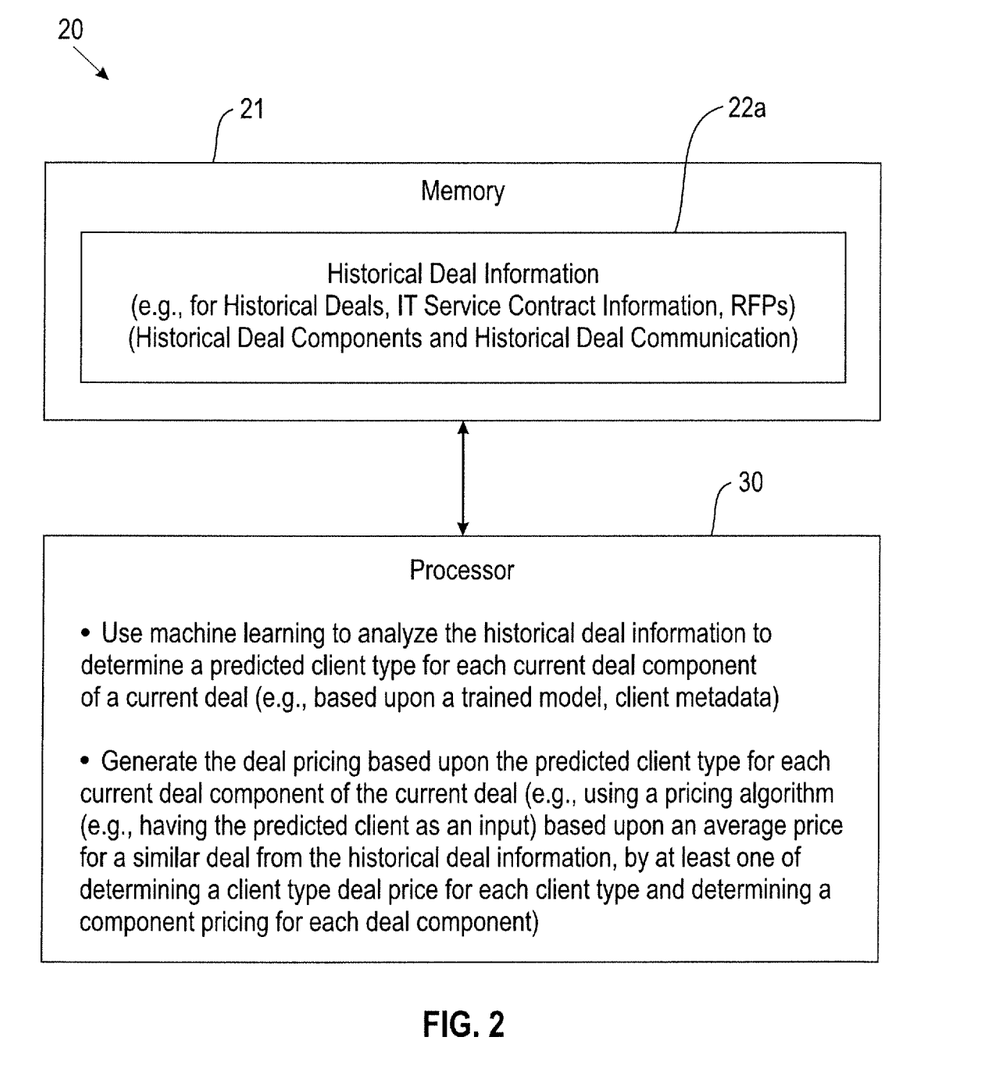
FIG. 2 is another schematic diagram of a system for cognitive deal pricing in accordance with an embodiment.
Figure 3:
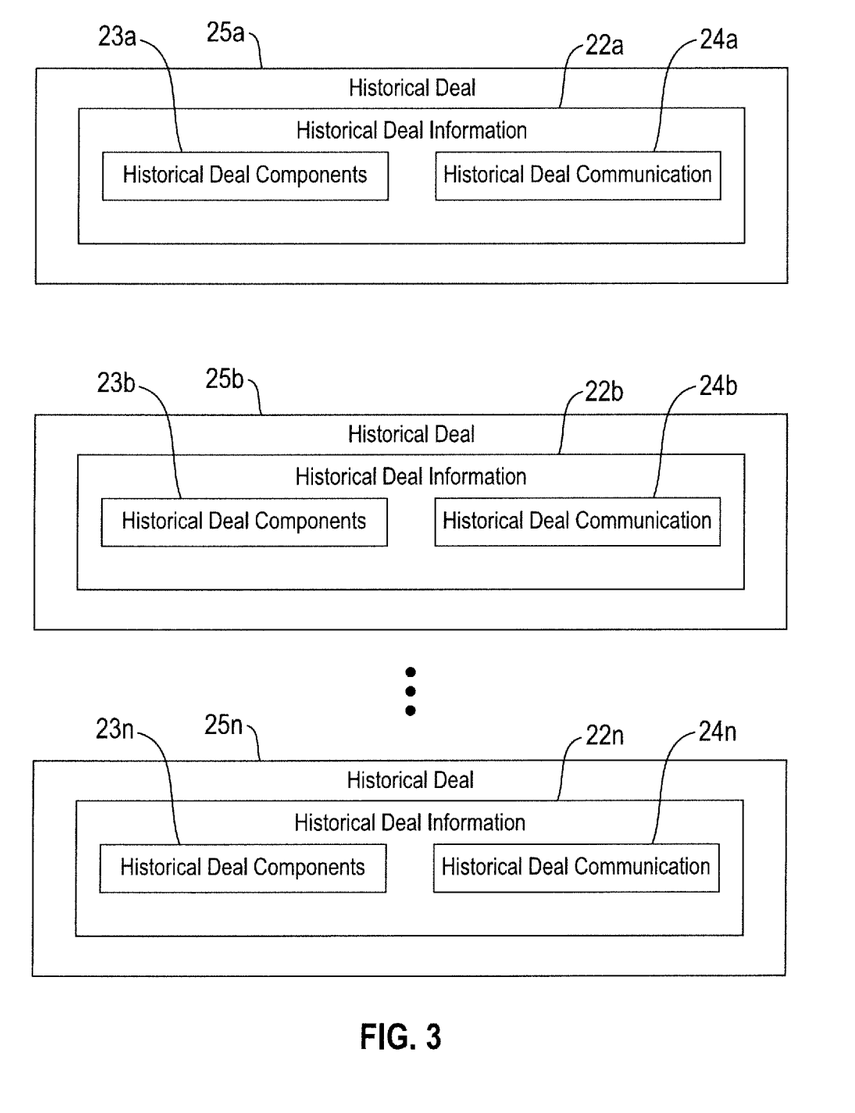
FIG. 3 is a diagram illustrating historical deals and included deal components for use with the system for cognitive deal pricing of FIG. 2.

Referring initially to FIGS. 1-3, a system for cognitive deal pricing 20 illustratively includes a memory 21 having stored thereon historical deal information 22*a*-22*n* (e.g., historical information technology (IT) service contract information) that includes historical deal components 23a-23n and historical deal communication 24a-24n associated therewith for each of a plurality of historical deals 25a-25n. The historical deal communication 24a-24n may include communications (e.g., emails, correspondence, etc.) with the client or clients. The historical deal communication 24a-24n may also include external communications, for example, from the Internet, news items, press releases, etc. The system 20 may also include a processor 30 cooperating with the memory 21.

As will be appreciated by those skilled in the art, a user may wish to determine pricing for a deal 41 (e.g., an optimum or best price for the deal based upon client information and current deal components 26a-26n). As will be described in further detail below, the system 20 will let the user know proposed deal pricing 31 that is, for example, most likely or more likely to be accepted by the client.

Figure 4:
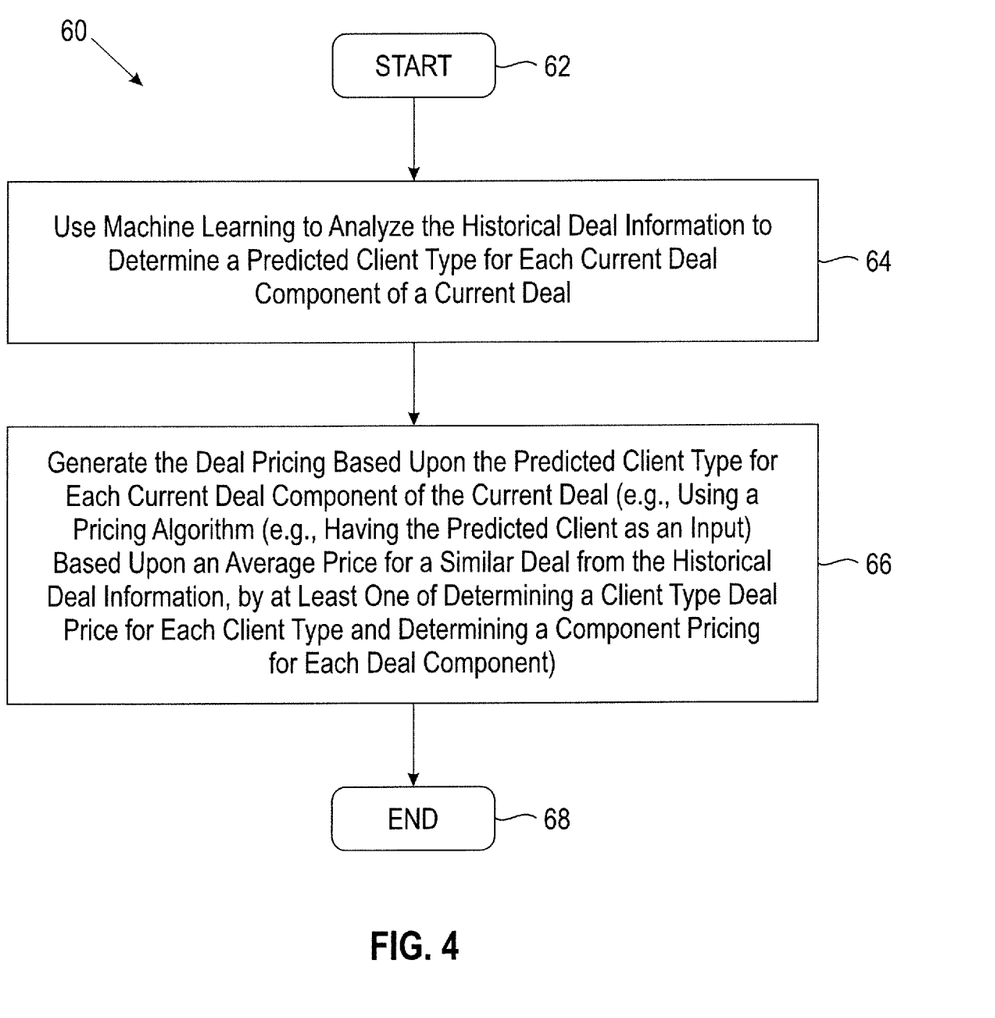
FIG. 4 is a flowchart of operation of a system for cognitive deal pricing in accordance with an embodiment.

Referring now additionally to the flowchart 60 in FIG. 4, beginning at Block 62, operations of the system 20 will now be described with reference to operations of the processor 30. At Block 64, the processor 30 uses machine learning 39 to analyze the historical deal information 22a-22n to determine a predicted client type 29a-29n or objective for each current deal component 26a-26n of a current deal 27. More particularly, the processor 30 may use machine learning 39 to analyze the historical deal information 22a-22n to determine the predicted client type 29a-29n for each current deal component 26a-26n based upon a trained model 32.

Figure 5:
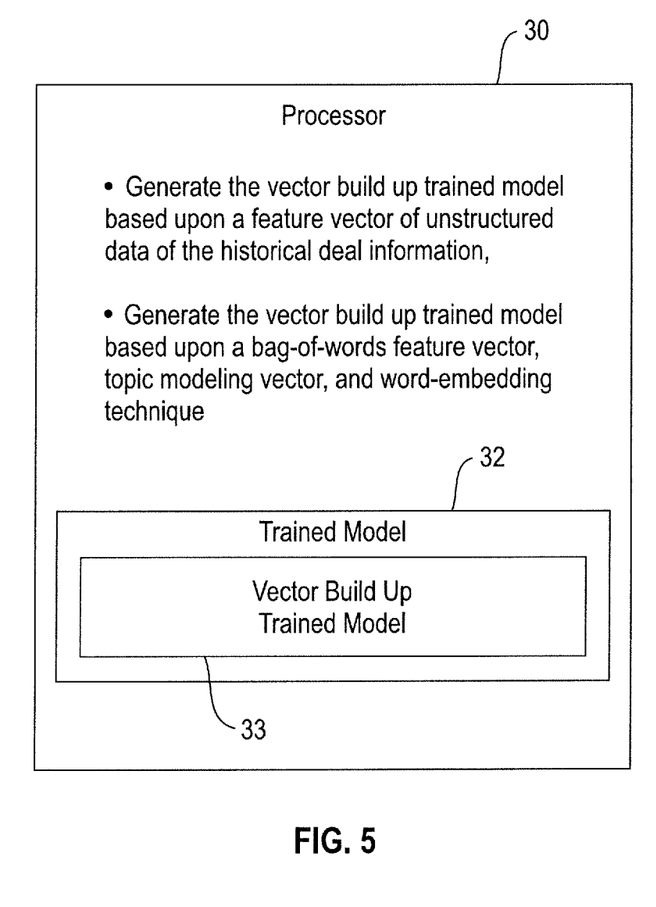
FIG. 5 is a schematic diagram illustrating processing of a trained model in accordance with an embodiment.

Referring now briefly to FIG. 5, the trained model 32 may be or include a vector build up trained model 33, for example. The vector build up trained model 33 may be based upon a feature vector for structured data of the historical deal information 22a-22n. The processor 30 may generate the vector build up trained model 33 based upon one or more of a bag-of-words feature vector, a topic modeling vector, and a word-embedding technique, as will be appreciated by those skilled in the art. The processor 30 may generate the vector build up trained model 33 based upon other and/or additional vector types and/or techniques.

Figure 6:
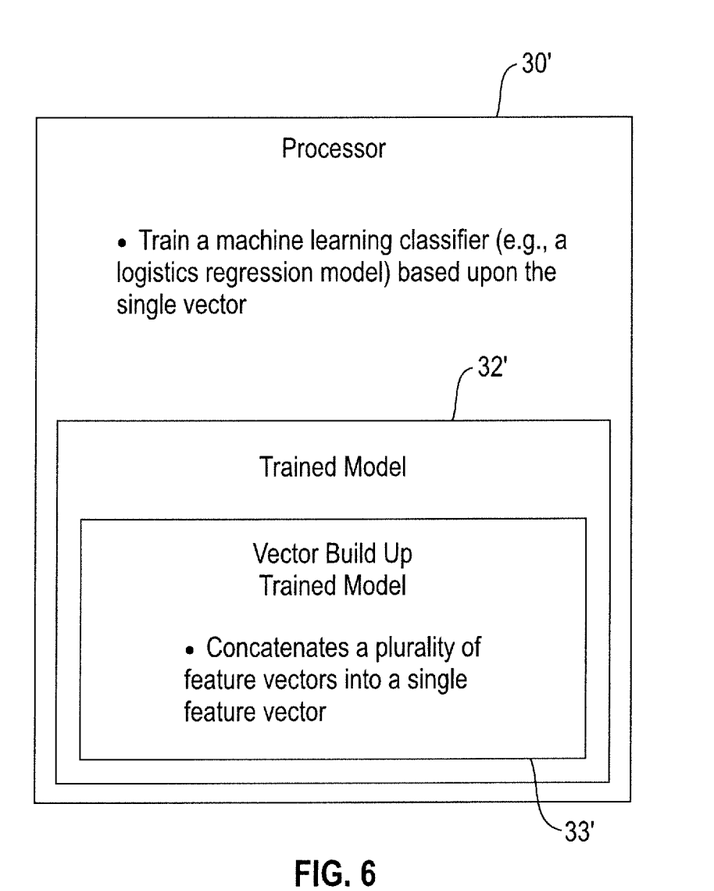
FIG. 6 is a schematic diagram illustrating processing of a trained model in accordance with another embodiment.

Referring now briefly to FIG. 6, in some embodiments, the trained model 32' may be or include the vector build up trained model 33' which may include a model that concatenates feature vectors into a single vector. The processor 30' may then train a machine learning classifier, for example, logistic regression model, based upon the single vector.

Figure 7:
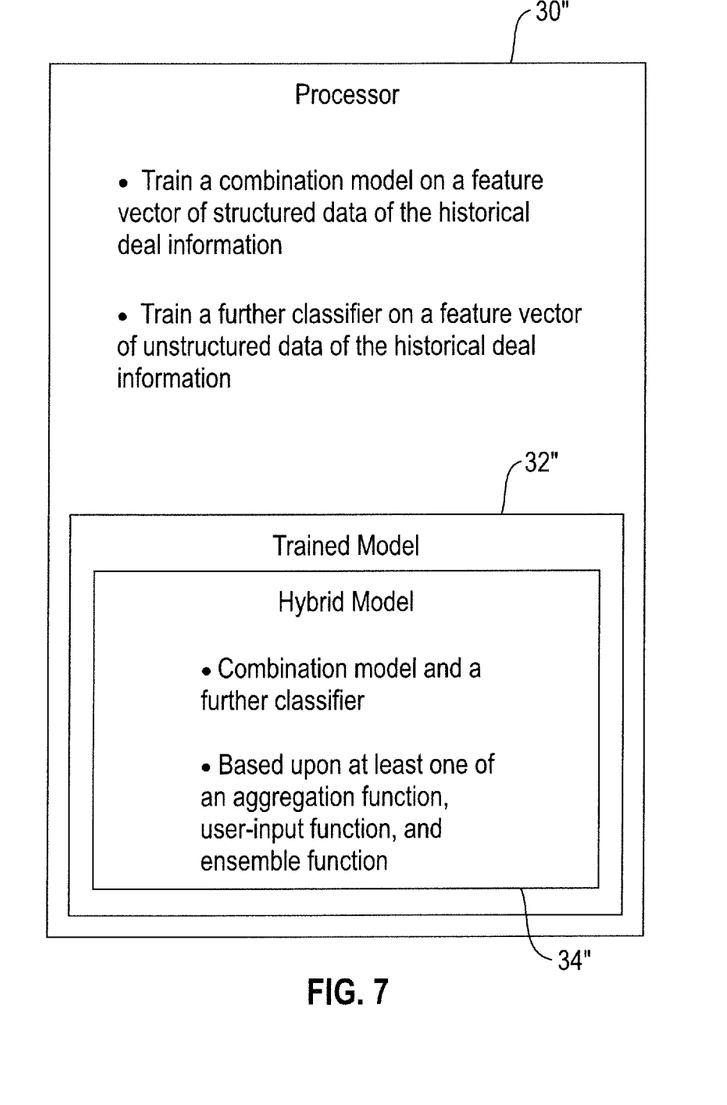
FIG. 7 is a schematic diagram illustrating processing of a trained model in accordance with another embodiment.

Referring briefly to FIG. 7, in another embodiment, the trained model 32" may include other and/or additional models. For example, the trained model 32" may include a hybrid model 34" based upon a combination model trained on a feature vector of structured data of the historical deal information, and a further classifier trained by processor 30" on a feature vector of unstructured data of the historical deal information. The hybrid model 34" may be based upon at least one of an aggregation function, a user-input function, and an ensemble function.

The processor 30 generates the deal pricing 31 based upon the predicted client type 29a-29n for each current deal component 26a-26n of the current deal 27 (Block 66). The processor 30 may generate the deal pricing 31 using a pricing algorithm based upon an average price for similar deals from the historical deal information 22a-22n, for example. The processor 30 may generate the deal pricing 31 based upon other and/or additional algorithms or data. The operations end at Block 68.

Figure 8:
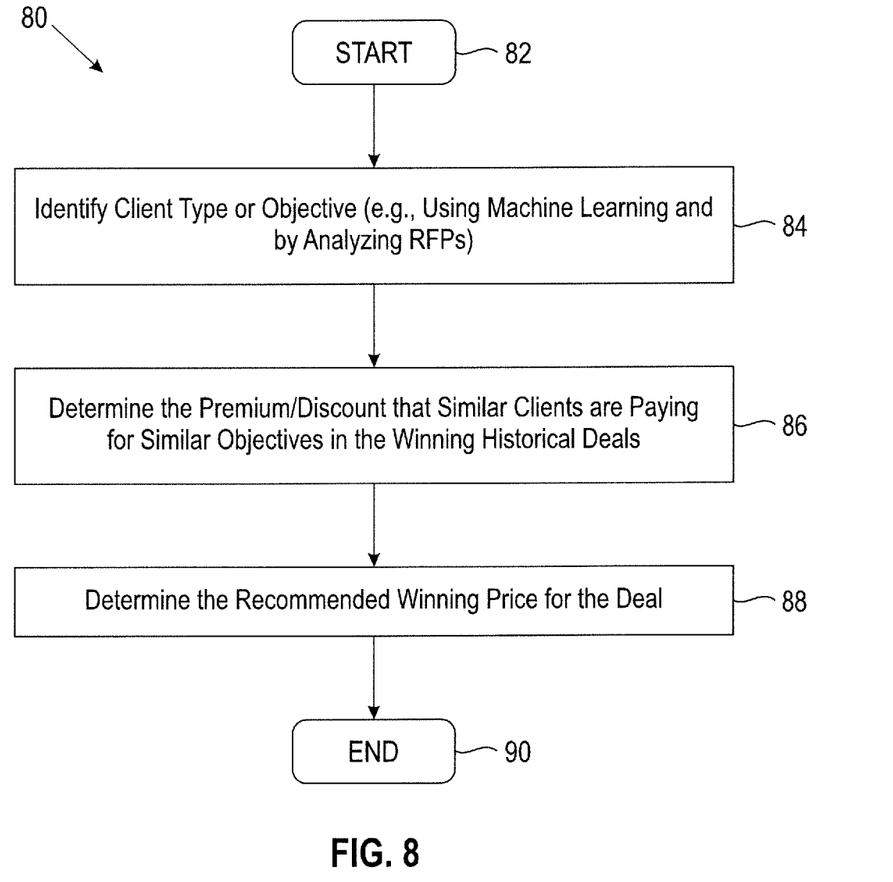
FIG. 8 is another flowchart of operation of a system for cognitive deal pricing in accordance with an embodiment.

Referring now to the flowchart 80 in FIG. 8, beginning at Block 82, further details of the system for cognitive deal pricing 20 will now be described. With respect to identifying a client objective or predicted client type 29a-29n (Block 84), RFPs are analyzed to identify the objective of the client for each solution component. The objective of the client for each solution component may be a percentage for each of the possible client objectives. Client objectives may include price (e.g. cost saver), consistency, value, and strategic partnerships (e.g., innovative partner), for example. Each client may be identified as being associated with other and/or additional predicted client types 29a-29n or objectives.

In one example implementation, the analysis may identify a client's objective for service A as having an innovative partner with a 70% chance and a cost-saver one with a 30% chance. In one embodiment, a rule-based and similarity-centric technique may be used by the processor 30 for identifying the client's objective for a given service. In another embodiments, the processor 30 may train a classifier on the service description in the client's historical RFPs and use it to predict the objective of the client for a given service.

For each of the client objectives, the processor 30 may define syntactic and semantic based rules to analyze the service descriptions and compute the similarity of service descriptions to the dictionaries describing each client objective. In a first step a dictionary for each of the client objectives may be built. In a second step, service descriptions associated with a given client may be compared to that of the keyword and phrases in the dictionary, and a similarity score may be computed based on the syntactic and semantic (synonyms) analysis of strings using any of known string-matching functions, such as Levinstein edit distance or approximate matching functions.

In another embodiment, the processor 30 may identify the client objective or determine a predicted client type 29a-29n by training, for example, using a built up feature vector 33 (feature vector build up) and model training, and predicting, for example, using a trained model 32 to do prediction. With respect to the feature vector build up 33, the feature vector build up may be built up based upon structured data, which may naturally form a feature vector, and unstructured data. Unstructured data may include any one or more of the following: a bag-of-word feature vector; any topic modeling feature vector (e.g., PLSA, LDA), and any word-embedding techniques (e.g., Word2Vec), With respect to model training to identify the client objective, in one embodiment a single model is used. More particularly, the processor 30 may concatenate the feature vector from structured and unstructured data into one single vector. Any available classifier (e.g., logistic regression, SVM, decision tree, etc.) would then be trained.

In another embodiment, a hybrid model 34" may be used. With respect to a hybrid model 34", the processor 30" may train any available classifier on a feature vector of structured data and train any available classifier on a feature vector of unstructured data. The two models may then be combined with any combination method, as will be appreciated by those skilled in the art, e.g., average, linear combination/weighted sum, non-linear combination.

Once the client objective has been identified, the premium/discount that similar clients are paying for similar objectives in the winning historical deals is determined (Block 86). To determine the premium/discount that similar clients are paying for similar objectives in the winning historical deals, the processor 30 builds a regression model to predict the premium/discount for each client objective. Features of that model may include client metadata (e.g., geography, industry, etc.), the client objective, and the cost for each solution component. Of course, the model may include other and/or additional features. The target of the model is the premium/discount paid for each solution component compared to the standard.

Next, the recommended winning price for the deal is determined (Block 88). To determine the recommended winning price for the deal, the processor 30 may sum all objectives i\in an objective class I (Percentage of belonging to objective class I*premium/discount of objective class I). The client type is incorporated into a pricing algorithm. The pricing algorithm is solved separately for each client type, and the expected price is then calculated, or a business may be provided with all the outputs (e.g. at this price, the percentage is xx % while at that price, the percentage is yy %, etc.).

The pricing algorithm may alternatively or additionally be solved separately for each solution component. When solving separately for each solution component, the client type may be included in the win prediction model to come up with the chances of winning a deal given the client type. The operations end at Block 90.

As will be appreciated by those skilled in the art, the system 20 may advantageously take into account the client objective or predicted client type 29a-29n at the individual solution component level, when pricing the deals by the providers. For example, clients looking for an innovation partner or a technology leader for particular components are typically willing to pay a higher premium on those components. The same client might be looking for a standard solution for another service. For that service, the price margin could be tight as the service provider may strategically take a loss on this component in order to be able to charge a premium on the aforementioned service. Accordingly, the system 20 may advantageously provide deal pricing 31 based on deal components and type of client for each component, which may increase the competitiveness of the service provider.

A method aspect is directed to a method for cognitive deal pricing that includes using a processor 30 cooperating with a memory 21 having stored thereon historical deal information 22a-22n comprising historical deal components 23a-23n and historical deal communication 24a-24n associated therewith for each of a plurality of historical deals 25a-25n. The processor 30 is used to use machine learning 39 to analyze the historical deal information 22a-22n to determine a predicted client type 29a-29n for each current deal component 26a-26n of a current deal 27, and generate the deal pricing 31 based upon the predicted client type for each current deal component of the current deal.

A computer readable medium aspect is directed to a computer readable medium for a system for cognitive deal pricing 20. The computer readable medium includes computer executable instructions that when executed by a processor 30 coopering with a memory 21 having stored thereon historical deal information 22a-22n comprising historical deal components 23a-23n and historical deal communication 24a-24n associated therewith for each of a plurality of historical deals 25a-25n, cause the processor to perform operations. The operations include using machine learning 39 to analyze the historical deal information 22a-22n to determine a predicted client type 29a-29n for each current deal component 26a-26n of a current deal 27, an generating the deal pricing 31 based upon the predicted client type for each current deal component of the current deal.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory for storing a computer program for cognitively determining deal pricing; and
a processor connected to said memory, wherein said processor is configured to execute the program instructions of the computer program comprising:
generating a trained model, wherein said trained model comprises a vector build up trained model, wherein said vector build up trained model comprises a model that concatenates a plurality of feature vectors into a single vector, wherein said vector build up trained model is generated based upon at least one of the following: a bag-of-words feature vector, a topic modeling vector and a word-embedding technique;
using machine learning to analyze historical deal information to determine a predicted client type for each current deal component of a current deal based upon said trained model, wherein said historical deal information comprises historical deal components and historical deal communications associated with historical deals;
determining said predicted client type for each current deal component of said current deal by analyzing requests for proposals to identify an objective of a client for each solution component, wherein said objective of said client for each solution component is a percentage value, wherein said client objective comprises a percentage of belonging to an objective class multiplied by a premium or a discount of said objective class;
defining syntactic and semantic based rules to analyze service descriptions;
computing a similarity of said service descriptions to dictionaries describing each client objective; and
generating said deal pricing based upon said predicted client type for each current deal component of said current deal using a pricing algorithm having said predicted client type as an input.

2. The system as recited in claim 1, wherein the program instructions of the computer program further comprise:
training a machine learning classifier based upon said single vector, wherein said machine learning classifier comprises a logistic regression model.

3. The system as recited in claim 1, wherein said client objective is identified using a rule-based and similarity-centric technique.

4. The system as recited in claim 1, wherein the program instructions of the computer program further comprise:
building a regression model to predict a premium or a discount for each client objective, wherein said regression model comprises client metadata, a client objective and a cost for each solution component.

5. The system as recited in claim 4, wherein the program instructions of the computer program further comprise:
summing all objectives in an objective class to generate said deal pricing.

6. A computer program product for cognitively determining deal pricing, the computer program product comprising one or more computer readable storage media having program code embodied therewith, the program code comprising programming instructions for:

generating a trained model, wherein said trained model comprises a vector build up trained model, wherein said vector build up trained model comprises a model that concatenates a plurality of feature vectors into a single vector, wherein said vector build up trained model is generated based upon at least one of the following: a bag-of-words feature vector, a topic modeling vector and a word-embedding technique;

using machine learning to analyze historical deal information to determine a predicted client type for each current deal component of a current deal based upon said trained model, wherein said historical deal information comprises historical deal components and historical deal communications associated with historical deals;

determining said predicted client type for each current deal component of said current deal by analyzing requests for proposals to identify an objective of a client for each solution component, wherein said objective of said client for each solution component is a percentage value, wherein said client objective comprises a percentage of belonging to an objective class multiplied by a premium or a discount of said objective class;

defining syntactic and semantic based rules to analyze service descriptions;

computing a similarity of said service descriptions to dictionaries describing each client objective; and generating said deal pricing based upon said predicted client type for each current deal component of said current deal using a pricing algorithm having said predicted client type as an input.

7. The computer program product as recited in claim 6, wherein the program code further comprises the programming instructions for:

training a machine learning classifier based upon said single vector, wherein said machine learning classifier comprises a logistic regression model.

8. The computer program product as recited in claim 6, wherein said client objective is identified using a rule-based and similarity-centric technique.

9. The computer program product as recited in claim 6, wherein the program code further comprises the programming instructions for:

building a regression model to predict a premium or a discount for each client objective, wherein said regression model comprises client metadata, a client objective and a cost for each solution component.

10. The computer program product as recited in claim 9, wherein the program code further comprises the programming instructions for:

summing all objectives in an objective class to generate said deal pricing.

* * * * *